(12) United States Patent
Marangoni

(10) Patent No.: US 11,241,021 B2
(45) Date of Patent: *Feb. 8, 2022

(54) CHOCOLATE COMPOSITIONS CONTAINING ETHYLCELLULOSE

(71) Applicant: Mars, Incorporated, McLean, VA (US)

(72) Inventor: Alejandro Gregorio Marangoni, Guelph (CA)

(73) Assignee: Mars, Incorporated, McLean, VA (US)

( * ) Notice: Subject to any disclaimer, the term of this patent is extended or adjusted under 35 U.S.C. 154(b) by 302 days.

This patent is subject to a terminal disclaimer.

(21) Appl. No.: 16/351,463

(22) Filed: Mar. 12, 2019

(65) Prior Publication Data

US 2019/0261644 A1  Aug. 29, 2019

Related U.S. Application Data

(63) Continuation of application No. 13/377,462, filed as application No. PCT/IB2010/001474 on Jun. 11, 2010, now abandoned.

(60) Provisional application No. 61/213,738, filed on Jul. 8, 2009, provisional application No. 61/213,480, filed on Jun. 12, 2009.

(51) Int. Cl.
| | |
|---|---|
| *A23G 1/40* | (2006.01) |
| *A23D 9/007* | (2006.01) |
| *A23D 9/02* | (2006.01) |
| *A23G 1/36* | (2006.01) |
| *A23G 1/54* | (2006.01) |
| *A23L 29/262* | (2016.01) |

(52) U.S. Cl.
CPC .............. *A23G 1/40* (2013.01); *A23D 9/007* (2013.01); *A23D 9/02* (2013.01); *A23G 1/36* (2013.01); *A23G 1/54* (2013.01); *A23L 29/262* (2016.08); *A23V 2002/00* (2013.01)

(58) Field of Classification Search
CPC ... A23G 1/40; A23G 1/36; A23G 1/54; A23D 9/007; A23D 9/02; A23L 29/262
See application file for complete search history.

(56) References Cited

U.S. PATENT DOCUMENTS

| | | |
|---|---|---|
| 1,364,192 A | 1/1921 | Friedman |
| 1,768,230 A | 6/1930 | Borg |
| 2,586,615 A | 2/1952 | Sherwood |
| 2,626,216 A | 1/1953 | Sherwood |
| 2,760,867 A | 8/1956 | Kempf |
| 2,863,772 A | 12/1958 | Kempf |
| 2,904,438 A | 9/1959 | Orourke |
| 2,951,763 A | 9/1960 | Keily et al. |
| 3,171,748 A | 3/1965 | Hendrik |
| 3,218,174 A | 11/1965 | Gian-Franco |
| 3,424,591 A | 1/1969 | Gold |
| 3,471,303 A | 10/1969 | Hamdy |
| 3,471,304 A | 10/1969 | Hamdy |
| 3,491,677 A | 1/1970 | Bracco |
| 3,638,553 A | 2/1972 | Kreuter |
| 3,935,319 A | 1/1976 | Howard |
| 4,041,188 A | 8/1977 | Cottier et al. |
| 4,045,583 A | 8/1977 | Jeffrey et al. |
| 4,061,786 A | 12/1977 | Winkler |
| 4,081,559 A | 3/1978 | Jeffrey |
| 4,098,913 A | 7/1978 | Baugher |
| 4,157,405 A | 6/1979 | Itagaki et al. |
| 4,182,778 A | 1/1980 | Hall |
| 4,199,611 A | 4/1980 | Ito et al. |
| 4,256,505 A | 3/1981 | Zweigle |
| 4,357,168 A | 11/1982 | Zweigle |
| 4,446,166 A | 5/1984 | Giddey et al. |
| 4,543,282 A | 9/1985 | Hammer |
| 4,664,927 A | 5/1987 | Finkel |
| 4,705,692 A | 11/1987 | Tanaka et al. |
| 4,726,959 A | 2/1988 | Momura et al. |
| 4,837,041 A | 6/1989 | Maruzeni et al. |
| 4,839,192 A | 6/1989 | Sagi et al. |
| 4,844,129 A | 7/1989 | Bridgeford |
| 4,847,105 A | 7/1989 | Yokobori et al. |
| 4,853,235 A | 8/1989 | Tomomatsu |
| 4,855,152 A | 8/1989 | Nakano et al. |

(Continued)

FOREIGN PATENT DOCUMENTS

| | | |
|---|---|---|
| AR | 078079 | 10/2011 |
| CA | 2298199 | 2/2000 |

(Continued)

OTHER PUBLICATIONS

Gauthier, P., Aiache, S., Aiache, J.M. 1994. "Novel glyceride gels II. Viscosity characteristics." International Journal of Cosmetic Science. vol. 18, pp. 229-235.*

Aiache et al., "New gelification method for vegetable oils I: cosmetic application," International Journal of Cosmetic Science, 1992, 14:228-234.

Chocolate Specifications, The Gazette of India, Extraordinary, pp. 380-381, 484-486, Part III-Sec. 4, 2018.

Almeida, et al., "Evaluation of the physical stability of two oleogels," International Journal of Pharmaceuticals, 2006, 327:73-77.

(Continued)

*Primary Examiner* — Nikki H. Dees

(74) *Attorney, Agent, or Firm* — Fish & Richardson P.C.

(57) ABSTRACT

A heat resistant chocolate containing ethylcellulose. The ethylcellulose is introduced into the chocolate as a solution in oil or in a non-aqueous solvent, suitably in an amount of from about 1% to about 3% ethylcellulose by weight. Ethylcellulose oleogels may also be used to replace a portion of the oils and fats normally present in chocolate and/or to formulate fillings for filled chocolates exhibiting reduced oil migration. Also provided are methods of making chocolate compositions according to the invention.

13 Claims, 4 Drawing Sheets

(56) References Cited

U.S. PATENT DOCUMENTS

| | | | |
|---|---|---|---|
| 4,873,109 A | 10/1989 | Tanaka et al. |
| 4,877,636 A | 10/1989 | Koyano et al. |
| 4,882,192 A | 11/1989 | Maeda et al. |
| 4,895,732 A | 1/1990 | Suwa et al. |
| 4,923,708 A | 5/1990 | Given |
| 4,980,192 A | 12/1990 | Finkel |
| 5,004,623 A | 4/1991 | Giddey et al. |
| 5,108,769 A | 4/1992 | Kings |
| 5,139,800 A | 8/1992 | Anderson |
| 5,149,560 A | 9/1992 | Kealey |
| 5,160,760 A | 11/1992 | Takemori et al. |
| 5,190,786 A | 3/1993 | Anderson et al. |
| 5,232,734 A | 8/1993 | Takemori et al. |
| 5,279,846 A | 1/1994 | Okumura |
| 5,324,533 A | 6/1994 | Cain et al. |
| 5,326,581 A | 7/1994 | Higashioka et al. |
| 5,344,664 A | 9/1994 | Fitch et al. |
| 5,348,758 A | 9/1994 | Fuisz et al. |
| 5,409,726 A | 4/1995 | Stanley |
| 5,424,090 A | 6/1995 | Okawauchi et al. |
| 5,431,947 A | 7/1995 | Bennett et al. |
| 5,431,948 A | 7/1995 | Cain et al. |
| 5,439,695 A | 8/1995 | Mackey |
| 5,445,843 A | 8/1995 | Beckett |
| 5,476,676 A | 12/1995 | Cain et al. |
| 5,486,049 A | 1/1996 | Boatman et al. |
| 5,486,376 A | 1/1996 | Alander |
| 5,505,982 A | 4/1996 | Krawczyk |
| 5,523,110 A | 6/1996 | Mandralis et al. |
| 5,538,748 A | 7/1996 | Boatman et al. |
| 5,556,659 A | 9/1996 | De Pedro et al. |
| 5,753,296 A | 5/1998 | Girsh |
| 5,876,774 A | 3/1999 | Nalur et al. |
| 5,882,709 A | 3/1999 | Zumbe |
| 5,902,621 A | 5/1999 | Beckett et al. |
| 5,928,704 A | 7/1999 | Takeda et al. |
| 5,965,179 A | 10/1999 | Ducret et al. |
| 6,001,399 A | 12/1999 | Kilibwa et al. |
| 6,010,735 A | 1/2000 | Frippiat |
| 6,025,004 A | 2/2000 | Speck et al. |
| 6,051,267 A | 4/2000 | Jury et al. |
| 6,063,408 A | 5/2000 | Yamazaki |
| 6,165,540 A | 12/2000 | Traitler et al. |
| 6,187,323 B1 | 2/2001 | Aiache |
| 6,251,448 B1 | 6/2001 | DeStephen |
| 6,258,398 B1 | 7/2001 | Okada et al. |
| 6,488,979 B1 | 12/2002 | Davila et al. |
| 6,620,450 B1 | 9/2003 | Davis et al. |
| 6,737,100 B1 | 5/2004 | Matsui et al. |
| 6,773,744 B1 | 8/2004 | Ward et al. |
| 6,783,783 B2 | 8/2004 | Clark et al. |
| 6,805,889 B1 | 10/2004 | Jury |
| 6,841,186 B2 | 1/2005 | Davila et al. |
| 6,875,460 B2 | 4/2005 | Cunningham et al. |
| 7,427,420 B2 | 9/2008 | Senba et al. |
| 7,579,031 B2 | 8/2009 | Simbuerger et al. |
| 7,727,574 B1 | 6/2010 | Ushioda et al. |
| 7,736,685 B2 | 6/2010 | Parsons et al. |
| 7,811,621 B2 | 10/2010 | Jury |
| 7,935,368 B2 | 5/2011 | Yamada |
| 8,017,163 B2 | 9/2011 | Simbuerger |
| 8,088,431 B2 | 1/2012 | Ward et al. |
| 8,231,923 B2 | 7/2012 | Okochi et al. |
| 8,293,314 B2 | 10/2012 | Bruese et al. |
| 8,323,015 B2 | 12/2012 | Day et al. |
| 8,545,921 B2 | 10/2013 | Gonus et al. |
| 8,607,980 B2 | 12/2013 | Aldricge et al. |
| 8,790,737 B2 | 7/2014 | Miguel et al. |
| 8,795,759 B2 | 8/2014 | Gantz |
| 8,802,178 B2 | 8/2014 | Wang et al. |
| 8,940,354 B2 * | 1/2015 | Marangoni ............ A23G 1/54 |
| | | 426/601 |
| 2002/0011181 A1 | 1/2002 | Cunningham et al. |
| 2002/0136818 A1 | 9/2002 | Nalur |
| 2005/0069617 A1 | 3/2005 | Diener et al. |
| 2005/0084598 A1 | 4/2005 | Higaki |
| 2005/0118327 A1 | 6/2005 | Best |
| 2006/0024416 A1 | 2/2006 | Casper |
| 2006/0210673 A1 | 9/2006 | Petrofsky |
| 2007/0116853 A1 | 5/2007 | Krohn |
| 2007/0218167 A1 | 9/2007 | Bhatia |
| 2008/0241342 A1 | 10/2008 | Pearson |
| 2008/0248186 A1 | 10/2008 | Bruse |
| 2009/0246330 A1 | 10/2009 | Zhong |
| 2009/0317528 A1 | 12/2009 | Abylov |
| 2010/0015279 A1 | 1/2010 | Zhang et al. |
| 2010/0123262 A1 | 5/2010 | Keller |
| 2010/0129519 A1 | 5/2010 | Hennen |
| 2010/0166911 A1 | 7/2010 | Upreti |
| 2010/0196550 A1 | 8/2010 | Mussumeci |
| 2010/0203193 A1 | 8/2010 | Zhang et al. |
| 2010/0303987 A1 | 12/2010 | Watts et al. |
| 2010/0323067 A1 | 12/2010 | Hess |
| 2011/0008521 A1 | 1/2011 | Paggios |
| 2011/0038995 A1 | 2/2011 | Thulin |
| 2011/0244082 A1 | 10/2011 | Vaman |
| 2011/0274813 A1 | 11/2011 | Kowalczyk |
| 2012/0058228 A1 | 3/2012 | Wales |
| 2012/0091132 A1 | 4/2012 | Obolenski |
| 2012/0183663 A1 | 7/2012 | Marangoni |
| 2012/0207880 A1 | 8/2012 | Shin et al. |
| 2012/0282375 A1 | 11/2012 | Scavino |
| 2013/0189411 A1 | 7/2013 | Henry |
| 2013/0264743 A1 | 10/2013 | Urushidani |
| 2013/0292458 A1 | 11/2013 | Cheema |
| 2014/0044839 A1 | 2/2014 | Cattaruzza et al. |
| 2014/0234492 A1 | 8/2014 | Matsuura |
| 2014/0322391 A1 | 10/2014 | Althaus |
| 2016/0000113 A1 | 1/2016 | Potter |
| 2016/0100590 A1 | 4/2016 | Cattaruzza et al. |

FOREIGN PATENT DOCUMENTS

| | | |
|---|---|---|
| CA | 2702493 | 11/2011 |
| CH | 399891 | 9/1965 |
| CH | 409603 | 3/1966 |
| CH | 410607 | 3/1966 |
| CH | 489211 | 4/1970 |
| CH | 519858 | 3/1972 |
| CH | 700968 | 11/2010 |
| CN | 1124096 | 6/1996 |
| CN | 1248909 | 3/2000 |
| CN | 101288414 | 10/2008 |
| CN | 101420951 | 4/2009 |
| CN | 101448414 | 6/2009 |
| CN | 102187930 | 9/2011 |
| CN | 102423947 | 4/2012 |
| DE | 20202201 | 6/2002 |
| EP | 0072785 | 2/1983 |
| EP | 0206850 | 12/1986 |
| EP | 0407347 | 1/1991 |
| EP | 0426155 | 5/1991 |
| EP | 0442324 | 8/1991 |
| EP | 0688506 | 12/1995 |
| EP | 0958747 | 11/1999 |
| EP | 0724835 | 11/2000 |
| EP | 1120455 | 8/2001 |
| EP | 23 86206 | 11/2011 |
| GB | 317335 | 8/1929 |
| GB | 847340 | 9/1960 |
| GB | 904197 | 8/1962 |
| GB | 1219996 | 1/1971 |
| GB | 1538750 | 1/1979 |
| GB | 2003912 | 3/1979 |
| GB | 2028862 | 3/1980 |
| GB | 2168071 | 6/1986 |
| GB | 2391448 | 2/2004 |
| GB | 2445539 | 7/2008 |
| JP | 52148662 | 12/1977 |
| JP | 5338665 | 4/1978 |
| JP | 5359072 | 5/1978 |
| JP | 5399362 | 8/1978 |
| JP | 56127052 | 10/1981 |
| JP | 57152852 | 9/1982 |

(56) References Cited

FOREIGN PATENT DOCUMENTS

| | | |
|---|---|---|
| JP | 5914752 | 1/1984 |
| JP | 6058052 | 4/1985 |
| JP | 60207549 | 10/1985 |
| JP | 61139338 | 6/1986 |
| JP | 6122493 5 | 10/1986 |
| JP | 61293344 | 12/1986 |
| JP | 62122556 | 6/1987 |
| JP | 6353250 | 3/1988 |
| JP | 63192344 | 8/1988 |
| JP | 02163039 | 6/1990 |
| JP | 04258252 | 9/1992 |
| JP | 04281744 | 10/1992 |
| JP | 5227887 | 9/1993 |
| JP | 0622694 | 2/1994 |
| JP | 07123922 | 5/1995 |
| JP | 07264981 | 10/1995 |
| JP | 08168343 | 7/1996 |
| JP | 10165100 | 6/1998 |
| JP | 2000109879 | 4/2000 |
| JP | 2000166475 | 6/2000 |
| JP | 2002209521 | 7/2002 |
| JP | 2003225055 | 8/2003 |
| JP | 2004298041 | 10/2004 |
| JP | 2005034039 | 2/2005 |
| JP | 2006109762 | 4/2006 |
| WO | WO 1991019424 | 12/1991 |
| WO | WO 1992003937 | 3/1992 |
| WO | WO 1993019613 | 10/1993 |
| WO | WO 1996022696 | 8/1996 |
| WO | WO 199922605 | 5/1999 |
| WO | WO 1999022605 | 5/1999 |
| WO | WO 1999045790 | 9/1999 |
| WO | WO 1999062497 | 12/1999 |
| WO | WO 2003 053152 | 7/2003 |
| WO | WO 2004077964 | 9/2004 |
| WO | WO 2006040127 | 4/2006 |
| WO | WO 2007112077 | 10/2007 |
| WO | WO 2008081175 | 7/2008 |
| WO | WO 2008150169 | 12/2008 |
| WO | WO 2009029577 | 3/2009 |
| WO | WO 2010063076 | 6/2010 |
| WO | WO 2011010105 | 1/2011 |
| WO | WO 2011121337 | 10/2011 |
| WO | WO 2012041629 | 4/2012 |
| WO | WO 2012146920 | 11/2012 |
| WO | WO 2012146921 | 11/2012 |
| WO | WO 2013039831 | 3/2013 |
| WO | WO 2013039873 | 3/2013 |
| WO | WO 2013092643 | 6/2013 |
| WO | WO 2014149551 | 9/2014 |

OTHER PUBLICATIONS

Bourne, et al., "Texture profile analysis," Food Technology, 1978, 32:62-66.
Dicolla, "Characterization of heat resistant milk chocolates," MS Thesis, Food Science, Pennsylvania State University, Feb. 26, 2009.
Goh, et al., "Determination of mono- and diglycerides in palm oil, olein, and stearin," JAOCS, 1985, 62(4):730-734.
International Search Report and Written Opinion in PCT Appln. No. PCT/IB2010/001474, dated Oct. 27, 2010, 7 pages.
Killian, "Development of water-in-oil emulsions for application to model chocolate products," May 2, 2012.
Martinez, "Influence of the concentration of a gelling agent and the type of surfactant on the rheological characteristics of oleogels," Il Farmaco, 2003, 58:1289-1294.
Potter, "Food Science," 2nd Ed., The AVI Publishing Company, Inc., Westport, CT., 1973, 50-51.
Siew, "Diglyceride content and composition as indicators of palm oil quality," J. Sci. Food Agric., 1995, 69:73-79.
Stopsky, et al., "Chemistry of fats and by-products of processing raw fat materials", Moscow, Kolas, 1992, 153-154.
Stortz, et al., "Heat resistant chocolate," Trends in Food Science & Technology, 2011, 22:201-214.
Swern, "Bailey's industrial oil and fat products," 4th Ed., John Wiley and Sons, New York, 1979, 46-51.
Zhong, et al., "The Technology of Making Cakes and the Recipe", Chemical Industry Press, Mar. 2009, 46-47.

* cited by examiner

CHOCOLATE COMPOSITIONS CONTAINING ETHYLCELLULOSE

RELATED APPLICATIONS

This application is a continuation, and claims priority of co-pending U.S. application Ser. No. 13/377,462, having a 371 completion date of Apr. 10, 2012, which is a U.S. National Stage application, and claims priority of International Application No. PCT/IB2010/01474, filed Jun. 11, 2010, which claims priority of U.S. Provisional Application Ser. No. 61/213,738, filed Jul. 8, 2009, and 61/213,480, filed Jun. 12, 2009. The contents of all of the prior applications are incorporated herein by reference in their entirety.

FIELD OF THE INVENTION

The present invention relates to chocolate compositions and products that contain ethylcellulose.

BACKGROUND OF THE INVENTION

One technical problem addressed by the present invention is the provision of heat-resistant chocolate. That is to say, chocolate that can retain its shape at higher temperatures, for example temperatures above about 30° C. or even above 40° C. The provision of such a heat-resistant chocolate that also achieves good mouthfeel and taste properties would greatly simplify the distribution and consumption of chocolate in hot countries.

Ordinary chocolate is composed primarily of fats or fatty substances, such as cocoa butter, in which there are dispersed non-fat products such as cocoa components, sugars, proteins, etc. Therefore, since chocolate is primarily constituted by fat bodies, its melting temperature is relatively low. This means that ordinary chocolate is not particularly resistant to summer temperatures or the heat of tropical countries. Therefore, a need exists for a chocolate which is resistant to relatively high ambient temperatures.

A variety of means have been utilized in the past to attempt to remedy the relatively low melting temperature of ordinary chocolate. For example, fats of higher melting temperature can be selected for incorporation into the chocolate.

US2008/0248186 describes heat-resistant chocolate made with an interesterified cocoa butter having higher melting properties than unmodified cocoa butter. However, this procedure is expensive, and can result in chocolate having an undesirable taste and/or texture.

Methods which disrupt the continuous chocolate fatty phase, thereby minimizing the influence of the melting point of the fat on the overall softening of the chocolate mass, have also been used. Such disruption of the continuous chocolate fatty phase has been effected in the past by various means, including direct water addition to the chocolate. Unfortunately, chocolate manufactured by direct water addition exhibits inferior product quality due to a coarse, gritty texture. Disruption of the continuous chocolate fatty phase has also been effected by including in the composition a variety of particles, often solid particles. These processes unfortunately often result in an undesirable rough texture, or mouth feel, in the chocolate.

CH-A-410607 concerns a chocolate composition which contains hydrophilic substances such as dextrose, maltose, inverted sugar, etc. When chocolate is made with such a composition, it is exposed to a moist atmosphere whereby it absorbs a certain quantity of water. This causes a relative increase in the volume occupied by the hydrophilic substances and was said to improve heat resistance.

CH-A-399891 and CH-A-489211 are directed to a method of incorporating amorphous sugars into a chocolate composition during manufacture. The sugars cause the formation in the mass of a lattice structure which prevents collapse of the mass when the temperature exceeds the melting point of the fat bodies used in its preparation.

CH-A-409603 involves the direct incorporation of water into a chocolate composition during its manufacture. The water however, which is about 5% relative to the composition, causes a rapid thickening of the mass at temperatures where normally the mass is still a liquid. Unfortunately, since the mass is no longer liquid, it is not possible to use the composition to cast chocolate into molds. Thus the composition must be ground and the obtained powder must be pressed into shape by compression molding.

U.S. Pat. No. 2,760,867 involves the incorporation of water into chocolate by the addition of an emulsifier such as lecithin. U.S. Pat. No. 4,081,559 concerns the addition to chocolate of an amount of sugar such that when the quantity of water required to obtain heat-resistant chocolate is added, there is formed an aqueous sugar solution in which at least one edible fat of the chocolate is emulsified.

U.S. Pat. No. 4,446,116 is directed to a composition used in the preparation of a heat-resistant chocolate. However, the water-in-fat emulsion prepared in accordance with the teachings of this patent results in a product containing at least 20% of the fat in solid form, and the water-in-fat mixture used in accordance with this patent does not remain in liquid form during processing. Presence of such solid bodies results in an undesired rough texture or mouth feel.

U.S. Pat. No. 5,149,560 describes a heat-resistant or thermally robust chocolate and method for making same by adding moisture to chocolate through use of lipid microstructure technology such as reverse micelle technology to form a stable water-in-oil emulsion, for example, hydrated lecithin. The stable water-in-oil emulsion is added to tempered chocolate during processing, and upon aging and stabilization, thermal robustness develops in the chocolate product. Further heat-resistant chocolate comprising water-in-oil microemulsions is described in U.S. Pat. No. 5,486,376.

U.S. Pat. No. 6,010,735 describes a heat-resistant chocolate made by incorporating water in the form of a dispersion of an aqueous gel, wherein the gelling agent is an edible carbohydrate or a pectin.

U.S. Pat. No. 4,664,927 describes a heat-resistant chocolate made by adding a polyol, such as glycerol or sorbitol, to chocolate. CH-A-519858 involves incorporating fat bodies into a chocolate composition in an encapsulated state to improve heat resistance. U.S. Pat. No. 4,081,559 describes a heat-resistant chocolate made by dispersing the fat phase of the chocolate in a sugar glass matrix.

EP-A-0688506 describes a heat-resistant chocolate made by mixing a polyol gel product in particulate form with a flowable mixture of chocolate type ingredients. The polyol gel may be formed by gelation of a polyol or a polyol/water mixture with a gelling agent. The polyol which is used for gelation is preferably a liquid such as a dihydric alcohol, a trihydric alcohol such as glycerol, mannitol, sorbitol, propylene glycol or corn syrup or any combination thereof.

A further technical problem addressed by the present invention is the use of inexpensive and/or healthy oils in the fat phase of chocolate or in fat-based fillings for filled chocolates. Research into the role fats and oils play in human health has indicated that consumption of saturated fats and trans fatty acids is associated with increased incidences of cancer, heart disease, elevated cholesterol levels and a host of other health problems.

In the food industry there have been many attempts to find alternative components that can provide the desired features of texture, structuring, stability and taste that are normally found in animal and vegetable fats or hydrogenated oils. One alternative, organogels, have been recognized for their potential to be used to reduce oil migration in multi component foods and to act as an alternative to butter or margarine. Organogels can be used to provide structure to edible oils thereby reducing the need for saturated and trans fatty acids. While the potential of organogels as soft materials for use in the food industry is recognized, there is a lack of good food grade organogelators. There remains an unmet need for food grade compositions that can provide the functionality and properties of a solid fat at a reasonable cost.

U.S. Pat. No. 6,187,323 describes pharmaceutical and cosmetic compositions comprising a mixture of a gelled oil and an aqueous gel. The oil may be gelled with ethylcellulose by heating to 140° C. to dissolve the ethylcellulose.

WO2008/081175 describes compositions containing an active agent for cosmetic and pharmaceutical applications, similar to those of U.S. Pat. No. 6,187,323. The compositions are homogeneous mixtures (not emulsions) of an oil component with an aqueous component. The oil component is gelled with ethylcellulose at 120° C. or 150° C. prior to mixing with the aqueous component. The aqueous component is gelled with a conventional cosmetic gelling agent.

U.S. Pat. No. 4,098,913 describes edible fat particles for incorporation into textured protein meat analog products. The edible fat products are made by gelling an oil with ethylcellulose at 180° C. The gelled fat is then added to the meat analog product. There does not appear to be any disclosure of including a surfactant in the gelled oil.

M. A. Ruiz-Martinez et al. in *Il Farmaco*, 58 (2003) 1289-1294 describe compositions formed by dispersing ethylcellulose with certain polyethylene glycol (PEG)—olivate ester surfactants in olive oil at 100° C. Although these compositions are described as oleogels, the description and rheological data in the reference confirm that they are not, in fact, gels. In particular, the measured ratios of elastic modulus to viscous modulus (G'/G") for the compositions are much less than 1 when measured at 1 Hz, which is consistent with viscous liquids or pastes but not gels.

A further technical problem addressed by the present invention is the reduction of oil migration in filled chocolate products. This problem arises in chocolates having a chocolate coating over an oil- or fat-containing filling such as a praline, a mousse, a cream, or a ganache (e.g. truffle) filling. Over time, it is found that oil from the filling migrates through the chocolate coating to form an oil bloom on the surface of the chocolate coating. This problem is sometimes addressed by providing a barrier layer between the fat-based filling and the chocolate coating, for example a layer of an oleophobic or hydrophilic material such as a sugar or a starch.

SUMMARY OF THE INVENTION

In a first aspect, the present invention provides a heat resistant chocolate containing ethylcellulose.

In a second aspect, the present invention provides a chocolate composition comprising an ethylcellulose oleogel.

In a further aspect, the present invention provides a filled chocolate product having a chocolate coating and a filling, wherein the filling comprises an ethylcellulose oleogel.

In a further aspect, the present invention provides a method of preparing a chocolate composition, said method comprising:
 a) preparing a mixture of food-grade ethylcellulose in an edible oil;
 b) adding a surfactant to the ethylcellulose and oil mixture;
 c) heating the ethylcellulose/oil/surfactant mixture to a temperature above the glass transition temperature of the ethylcellulose with mixing, followed by
 d) adding this stock to a reduced fat chocolate composition.

Suitably, in embodiments according to this aspect, said method comprising the steps of:
 a) preparing a mixture of ethylcellulose, sorbitan monostearate (SMS) and an oil at a ratio of about 18:6:76 w/w/w,
 b) heating the mixture to a temperature above the glass transition temperature of the ethylcellulose polymer while mixing, and
 c) adding this stock to a reduced fat, heated chocolate at 60° C. to 90° C. at 1:3 to 1:9 (w/w) levels; and
 d) cooling the mixture to form said chocolate composition.

In a further aspect, the present invention provides a method of preparing a chocolate composition, said method comprising:
 a) preparing a mixture of ethylcellulose and 95-100% ethanol
 b) allowing the ethycellulose to dissolve completely in the ethanol to form an ethylcellulose-ethanol composition,
 c) adding the composition to a molten chocolate stock at a ratio of about 5-15% w/w to form a chocolate composition,
 e) cooling the chocolate composition to about 5-15° C., and
 f) removing the alcohol from the chocolate composition.

It will be appreciated that any feature that is described herein in relation to any one or more aspects of the invention may also be applied to any other aspect of the invention. The compositions of the invention are suitably obtainable by, or produced by, one of the methods of the invention.

It has been found that chocolate wherein at least a portion of the fat continuous phase contains dissolved ethylcellulose exhibits remarkable resistance to softening at temperatures of up to 40° C. or more. The invention also potentially allow for a wide range of new chocolate compositions by replacing fats or oils conventionally present in chocolate by oils that have been gelled with ethylcellulose. Some of these replacement oils could contain particularly low levels of saturated fat and thus be healthier. Finally, the use of ethylcellulose-gelled oils in the fat-based fillings of filled chocolates reduces oil migration from the filling to the surface of the chocolate.

Suitably, the chocolate compositions according to the present invention comprise from about 0.5% to about 5% w/w, for example from about 1.5% to about 3% w/w, in particular from about 2% to about 2.5% w/w ethylcellulose. At lower ethylcellulose contents the chocolate may lack sufficient heat resistance. At higher ethylcellulose contents the melted chocolate may become too viscous to pump or mold conveniently.

DESCRIPTION OF THE DRAWINGS

These and other features of the invention will become more apparent from the following description in which reference is made to the appended drawings, wherein.

DETAILED DESCRIPTION OF THE INVENTION

Figure 1:
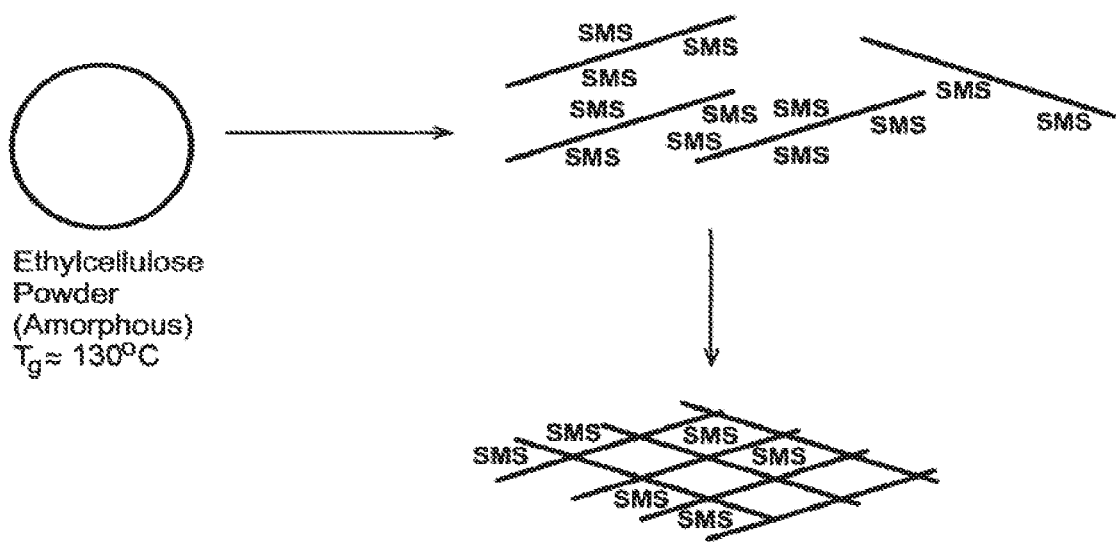
FIG. 1 is a schematic illustrating the formation of a polymer organogel by heat treatment.

The term "chocolate" is intended to refer to all chocolate or chocolate-like compositions with a fat phase or fat-like composition. As the invention is directed in certain aspects to the control of the characteristics of the fat or fat-like phase of the chocolate, rather than the non-fat materials within the chocolate, the term is intended to include all chocolate and chocolate-like compositions. The term is intended, for example, to include standardized and non-standardized chocolates, i.e., including chocolates with compositions conforming to the U.S. Standards Of Identity (SOI) and compositions not conforming to the U.S. Standards Of Identity, respectively, including dark chocolate, baking chocolate, milk chocolate, sweet chocolate, semi-sweet chocolate, buttermilk chocolate, skim-milk chocolate, mixed dairy product chocolate, low fat chocolate, white chocolate, aerated chocolates, compound coatings, non-standardized chocolates and chocolate-like compositions, unless specifically identified otherwise. Relevant US Standards of Identity include those identified in the Code of Federal Regulations as revised 1 Apr. 2009 under references 21CFR163.XXX, wherein XXX=123, 124, 130, 135, 140, 145, 150, 153 or 155. Chocolate herein also includes those containing crumb solids or solids fully or partially made by a crumb process.

Nonstandardized chocolates are those chocolates which have compositions which fall outside the specified ranges of the standardized chocolates. Nonstandardized chocolates result when, for example, the nutritive carbohydrate sweetener is replaced partially or completely; or when the cocoa butter or milkfat are replaced partially or completely; or when components that have flavors that imitate milk, butter or chocolate are added or other additions or deletions in formula are made outside the FDA standards of identity of chocolate or combinations thereof.

The term "heat resistant chocolate" herein refers to a modified chocolate composition that remains firm at temperatures up to at least about 40° C. Conventional chocolate melts at temperatures in the range 32° C.-40° C., depending on its composition and manufacturing method. Suitably, the heat resistant chocolate of the present invention exhibits a yield force at 2 mm displacement and 40° C., measured according to Procedure 1 below, of at least about 300 grams force (gf), for example at least about 600 gf, suitably at least about 1000 grams force (gf). Suitably, the chocolate compositions also remain substantially non-sticky at temperatures of at least about 40° C. Suitably, the chocolate compositions according to the present invention comprise less than about 2 wt. % of water, for example less than about 1.5 wt. % of water, typically less than about 1 wt. % of water.

Ethylcellulose (EC) is a nutritionally beneficial fiber and nutritional fibers are often lacking in our diets, In addition, ethycellulose is a GRAS material (generally regarded as safe) for use in food products making EC, particularly EC having intermediate viscosities such as about 10 cp to about 50 cp, especially suitable for the invention. The cp values refer to viscosity in centipoise of a 5% solution of the EC in 80% toluene/20% ethanol at 25° C., and therefore correlate to the molecular weight of the EC. The weight fraction of ethoxyl groups of the ethylcellulose is suitably from about 25% to about 75%, for example from about 40% to about 60%. Suitable ethylcelluloses are available from Dow Chemical Co. under the registered trade mark ETHOCEL.

The term "gel" herein is used in its usual sense of a material having a continuous structure with macroscopic dimensions that is permanent on the time scale of an analytical experiment and is solid-like in its rheological properties. Gels bounce rather than flow, and exhibit substantially linear viscoelastic characteristics, at stresses below their yield stress. Gels have a melting point. Gels are conveniently defined by their rheological properties, in particular their yield stress and the ratio of their elastic modulus to their viscous modulus (G'/G") as measured at 20° C. and 1 Hz in a conventional viscoelastic analyzer as described below. Gel-like behaviour is characterized by G'/G" greater than about 1 under these conditions. The gels of the present invention suitably have yield stresses greater than about 10 Pa, more suitably greater than about 20 Pa, for example from about 25 Pa to about 300 Pa. The gels of the present invention suitably have G'/G" greater than about 1, more suitably greater than about 2, under these conditions.

The gels used in the invention may be strong gels. Strong gels are preferred for food applications because they have physical properties closer to those of fat, and are more effective for reducing oil migration. The term "strong gel" herein refers to gels having high mechanical strength and elasticity. Suitably, strong gels have yield stresses greater than about 50 Pa and G'/G" greater than about 3 for example greater than about 5 at 1 Hz and 20° C.

The term "oleogel" herein refers to a gel having a continuous oil phase having the ethylcellulose uniformly dispersed in the gel phase and functioning as the gelling agent.

The oleogels are suitably clear and translucent or even transparent materials having the physical properties of a true gel as described above. A surfactant is suitably likewise homogeneously distributed through the gel. Thus, the surfactant is not concentrated at the surface of oil or water micelles as in an emulsion, nor in layered structures as in a liquid crystal. The oleogel may consist essentially of one or more oils or fats, the ethylcellulose, and the surfactant. The oleogel is suitably anhydrous, that is to say it suitably has a water content of less than about 10% w/w, for example less than about 5% w/w, more suitably less than about 2% w/w.

It has now been found that dispersing a solution of ethylcellulose in melted chocolate prior to cooling and solidification of the chocolate results in an increase in the heat resistance of the resulting chocolate compared to an identical composition prepared without the ethylcellulose. The benefits of improved heat resistance, reduced oil migration, etc. are diminished or eliminated if the ethylcellulose is added directly as powder to melted chocolate at temperatures below 100° C. It is thought that the step of dissolution substantially changes the secondary structure of the ethylcellulose molecule to provide the benefits of the invention. The term "dissolved ethylcellulose" herein therefore refers to ethylcellulose that has been dispersed in the chocolate as a solution of ethylcellulose in an oil or a suitable non-aqueous solvent. It appears that the effect of ethylcellulose on the heat resistance of chocolate may be due to a complex interaction between the ethylcellulose, the fat phase, and one or more of the solid phases in the chocolate.

The solution of ethylcellulose may be prepared by dissolving the ethylcellulose in a suitable food-acceptable non-aqueous solvent such as ethanol. In these embodiments, the solvent is normally removed by evaporation after mixing with the chocolate melt. Suitably, the ethylcellulose is dissolved in ethanol at a concentration of from about 1% w/v to about 40% w/v, for example about 10% w/v to about 25% w/v. The step of dissolving the ethylcellulose in the solvent may be performed at ambient or slightly elevated temperatures. The solution is added to chocolate in the molten state and mixed thoroughly. The solvent is removed by evaporation while the chocolate is in the molten state, or after setting of the chocolate, for example in a vacuum drier. This method is referred to herein as the "solvent substitution" method.

In alternative embodiments, the solution of ethylcellulose may be prepared by dissolving the ethylcellulose in a fat or oil at a temperature above the glass transition temperature of the ethylcellulose (Tg, typically about 130° C.), such as at least about 130° C., for example from about 135° C. to about 160° C. This is followed by at least partially cooling the solution and adding the solution to a reduced-fat chocolate mixture to achieve the final composition. The solution is suitably cooled to about 60° C. to about 90° C. before addition to the chocolate mixture. This process has the advantage that it avoids the use of volatile solvents. It has the further advantage that the ethylcellulose may initially be dissolved in an oil having desirable properties, and/or an oil that would not normally be suitable for use in the production of chocolate, and this oil may then replace a portion of the normal fat content of the chocolate. This is referred to herein as the "fat substitution" method.

Ethylcellulose (EC) has been shown to form anhydrous polymer organogels of edible oils at concentrations greater than 3% (w/w) in oil. To achieve this, the EC and surfactant in oil is heated up to a temperature above the glass transition temperature of the polymer (Tg is approximately 130° C.) with constant mixing. It has been found that the initial dispersion temperature above the glass transition temperature of the ethylcellulose is important to achieve complete dissolution of the ethylcellulose and a strong gel. After a few minutes, all the EC powder has dissolved and the solution is clear and very viscous (depending on the concentration of EC in oil). The useful concentration range is between 4% and 20% (w/w) EC in oil, for example from about 4% to about 10% w/w. EC will gel oil by itself; stable gels can be produced that are translucent and stiff, but they are grainy and brittle in nature, set very fast, and have a relatively high gelation temperature, typically about 110-120° C., which is not suitable for many food applications. It has been found that the addition of the surfactant provides important advantages in the compositions and methods of the invention. The surfactant does not reduce the temperature required for the initial dissolution of the ethylcellulose, which remains the glass transition temperature even in the presence of the surfactant. However, once the ethylcellulose has been dissolved to form the gel, the surfactant plasticises the gel to lower the gelation temperature of the formed gel. The solution of the ethylcellulose in the oil may therefore remain more readily miscible with the other ingredients during the step of addition to melted chocolate or dry chocolate ingredients at moderate temperatures, which is desirable for efficient mixing.

It has been found that the strength of the gel formed by dispersing ethylcellulose in oil depends on the choice of ethylcellulose, the oil, the presence of a surfactant, and the dispersion temperature.

Various types of oils may be used such as, but not limited to, Soybean oil, Canola oil, Corn oil, Sunflower oil, Safflower oil, Flaxseed oil, Almond oil, Peanut oil, Fish oil, Algal oil, Palm oil, Palm stearin, Palm olein, Palm kernel oil, high oleic soybean, canola, sunflower, safflower oils, hydrogenated palm kernel oil, hydrogenated palm stearin, fully hydrogenated soybean, canola or cottonseed oils, high stearic sunflower oil, Olive oil, enzymatically and chemically interesterified oils, butteroil, cocoa butter, avocado oil, almond oil, coconut oil, cottonseed oil, and mixtures thereof. A portion, for example up to about 50% w/w, of the oils may be replaced by one or more fats.

Soybean oil forms very strong gels, and so does corn oil and flaxseed oil. Canola oil and the high oleic oils, on the other hand form weaker gels. Flaxseed oil and most highly polyunsaturated nut, algal and fish oils form very strong gels. It would seem that oils that are high in polyunsaturates such as linoleic, linolenic, DHA and EPA acids form the strongest gels, while oils with high oleic acid contents do not form as strong gels. More highly polyunsaturated oils are also more polar and of higher density. Considering all of the above, for general fat applications, soybean oil or corn oil are preferred oils for the formation of gels. Medium and short-chain saturated fats and oils (MCTs) such as palm kernel oil and coconut oils also form strong gels. For the production of chocolate, palm kernel oil and cocoa butter are therefore suitable in view of the well known use of these oils in conventional chocolate compositions.

Suitably, the oleogels comprise from about 70% to about 95% of oils (including any fats), for example about 80% to about 90% of oils.

The addition of a surfactant to the polymer-oil mixture has been shown to result in the formation of polymer gels having desirable properties. Examples of surfactant components include, but are not limited to Polyoxyethylene sorbitan monooleate (Tween 80), Polyoxyethylene sorbitan monostearate (Tween 60), Sorbitan monooleate (SMO or Span 80), Sorbitan monostearate (SMS or Span 60), Glyceryl monooleate (GMO), Glycelyl monostearate (GMS) Glyceryl monopalmitate (GMP), Polyglyceryl ester of lauric acid—polyglyceryl polylaurate (PGPL), Polyglyceryl ester of stearic acid—polyglyeryl polystearate (PGPS), Polyglyceryl ester of oleic acid (PGPO)—Polyglyceryl polyoleate (PGPO), and Polyglyceryl ester of ricinoleic acid (PGPR).

The addition of a compatible surfactant plasticizes the polymer, slows down the gelation process (increases the gelation time) and induces the formation of stable, translucent, elastic, non-brittle gels. The surfactant does not lower the temperature that is needed to disperse ethylcellulose in oil initially (see below), but the surfactant does decrease the gelation and melting temperatures of the gel after it has formed. Suitably, the gelation temperature of the gel is reduced to about 40° C. to about 90° C., for example about 60° C. to about 80° C., by the surfactant. The term "gelation temperature" refers to the temperature at which the oil-ethylcellulose-surfactant solution becomes solid on cooling, as determined visually by inversion. Gelled oils that set above 100° C. would not be practical for mixing with melted chocolate, as heating the chocolate to such high temperature for inclusion of the polymer solution would destroy or severely modify the native food structure. Moreover, a fast gelation process would make it very difficult for the ethylcellulose to be added to food products—they would set into a gel too fast for proper incorporation and mixing. A preferred surfactant for use in foods is one that decreases the gelation temperature and slows down the gelation process.

Preferred surfactants were determined to be SMS, GMS, GMO, SMO and PGPL.

It will be apparent from the above that the surfactant is normally a non-ionic surfactant. Especially strong gels are observed when the surfactant is an ester of a saturated C10-C24, suitably C14-C20, fatty acid with a polyhydric alcohol having two, three or more hydroxyl groups. Suitable saturated fatty acids include stearic (C18) and palmitic (C16) acids. Suitably, the polyhydric alcohol has at least four hydroxyl groups, such as a sugar alcohol or a polyglycerol. An especially suitable surfactant of this type is SMS.

The mouthfeel of SMS and SMO are superior to the other surfactants.

Surfactant esters of unsaturated fatty acids, such as GMO and SMO, are extremely good plasticizers, to the point where the reduction in gelation and melting temperature can be too extreme, leading to the formation of a gel with decreased thermal resistance. This translates into a need to have a higher polymer concentration in the final product. PGPL is a very good plasticizer, but overheating of PGPL can lead to the hydrolysis of lauric acid, which has a very undesirable taste. Suitably, the surfactants used in the present invention do not comprise PEG olivate esters, more particularly Olivem 900, 700 or 300.

The stiffness of the polymer gel increases with an increasing amount of surfactant (a lower polymer to surfactant ratio). However, there is a limit to how much surfactant can be added to foods. The practical range is a 10:1 to 1:1 w/w ethylcellulose-to-surfactant ratio. A ratio of from about 4:1 to about 2:1 w/w for example 3:1 w/w ethylcellulose-to-surfactant was found to be a good compromise between obtaining good gel strength and minimizing the amount of surfactant added in a food product.

Without wishing to be bound by any theory, the suggested mechanism of thermal gel formation and surfactant interaction is shown in FIG. 1. In this example SMS is the surfactant. It is apparent to one skilled in the art that the same type of schematic can be applied to other surfactants.

The molecular weight of the ethylcellulose polymer plays a role in the formation of the gel. It has been found that EC with viscosity 4 cp forms very weak gels even at 10% (w/w) concentrations. EC with viscosities 100 cp and 300 cp are extremely high molecular weight polymer mixtures and are difficult to dissolve and mix, form very viscous sols, and set quickly at high temperatures (above 100° C.). This also enhances the incorporation of air bubbles into the melt, which is not desirable. Thus, the use of EC having viscosities 100 cp or 300 cp is not very practical in most food applications. Ethylcellulose of intermediate molecular weight, such as 10 cp, 22 cp and 45 cp form stiff, translucent and elastic gels at 5-6% (w/w) concentrations in the oil phase. EC 22 cp and 45 cp dissolve readily in the oil, the sols are not too viscous at 10-15% concentrations and they start gelling at temperatures between 70 and 90° C. EC 10 cp, 22 cp and 45 cp are suitable for chocolate.

As discussed above, EC 22 cp is a preferred polymer for use in the invention. Assuming an approximate molecular weight of EC 22 cp of 40,000 g/mol and of SMS of 430.62 g/mol, a 3:1 w/w polymer-to-surfactant ratio translates into a 1:31 mol/mol polymer-to-surfactant ratio. Considering the molecular weight of glucose as 180 g/mol, and of 50% substituted ethylglucose of 222 g/mol, and of a ethylglucose monomer in cellulose as 204 g/mol, this translates to approximately 196 monomers of glucose in EC22cps. Thus 196/31=6, meaning that one molecule of SMS is bound to every sixth glucose monomer in the EC22cps polymer. This is very relevant since proper gel formation depends on a balance between polymer-solvent and polymer-polymer interactions. Too high a solubility of the polymer in the oil will preclude gel formation upon cooling. Not enough solubilization will preclude proper polymer swelling and extension of the chains in the solvent, which will then interact and form junction zones upon cooling, leading to gelation. It appears that the strength of binding is an important factor, as well as polymer conformation.

The ethylcellulose oleogels may be added to fat-reduced chocolate compositions to replace a fraction of the fats present in chocolate with oils in order to enhance the healthiness of chocolate and/or to reduce the cost of chocolate and/or to improve the heat resistance of the chocolate, or for other purposes. This is referred to as the "fat substitution method" for producing chocolate compositions according to the invention. Suitably, from about 1% to about 100% by weight of the fat content of the chocolate is replaced by the ethylcellulose oleogel, for example from about 50% to about 90%. It will be appreciated that the oleogel may itself comprise a mixture of fats, including fats such as cocoa butter or PKO that are commonly found in chocolate.

The ethylcellulose oleogels may also be used to formulate fat-containing fillings for filled chocolates and chocolate-coated products having fat-containing fillings. The use of the ethylcellulose oleogels in these fillings provides the additional advantage of reduced oil migration from the filling through the chocolate coating layer. Fillings that may be formulated with the ethylcellulose oleogels include without limitation praline, ganache, cream and mousse fillings. Praline refers to a filling comprising crushed nuts, sugar and optionally other ingredients such as chocolate. Ganache refers to soft fillings based on a mixture comprising chocolate with cream, butter or other fats, for example chocolate truffle fillings. Cream refers to fillings having a fat/oil continuous phase. Mousse refers to fat-based aerated fillings. Suitably, the fillings in the filled chocolates of the invention comprise at least about 10% fat (and/or oil, i.e. total lipid content), for example from about 20% to about 60% fat. In all cases, a portion of the fat present in the filling is an ethylcellulose oleogel as above. For example, the fillings may comprise from about 5% to about 90% w/w of the oleogel, typically from about 10% to about 50% of the oleogel. Suitably, the fillings comprise from about 1 wt. % to about 15 wt. %, for example from about 2 wt. % to about 10 wt. % of ethylcellulose. The fillings are coated at least over a part of their surface, and preferably are completely coated, with a layer of chocolate, which may be a chocolate containing ethylcellulose according to the present invention.

Procedure 1

Deformation mechanical tests are carried out to demonstrate the heat resistance of chocolate. A Stable Microsystems mechanical tester was used to deform pieces of chocolate of approximate dimensions 35×17×7 mm. Both control and heat resistant chocolate pieces manufactured as described below were incubated in an oven at 40° C. (unless otherwise stated) for 2.5 hours. The pieces were then quickly transferred to the stainless steel base of the mechanical tester. A cylindrical probe of 18 mm diameter was used to carry out a simple compression test. The probe was lowered vertically at a rate of 10 mm/s to a maximum deformation of 4 mm along the 7 mm side of the chocolate piece. A clear yield force was observed in the proximity of 2 mm deformation (28.5% strain). Values quoted here are for grams force measured at 2 mm deformation.

Reference Example 1

A fat substitute is prepared as follows. Ethylcellulose 22 cp or 45 cp 9% w/w (ETHOCEL®, Dow Chemical Co.) and 3% w/w SMS in a 30:70 w/w mixture of fully hydrogenated soybean oil with liquid soybean oil were heated up 140° C. to ensure full solubilization of the polymer in oil. Upon cooling of the melt, at 100° C., soybean oil heated to 100° C. was added at a 1:2 ratio (1/3 dilution). The final concentration of components was 6% EC, 2% SMS, 20% fully hydrogenated soybean oil and 72% soybean oil. The mixture was then allowed to cool down and set. Fully hydrogenated cottonseed oil, fully hydrogenated canola oil, beef tallow, lard, milkfat could also be added as the hardstock. This material has the functionality and texture of a fat.

Reference Example 2

A 10% ethylcellulose 22cps gel containing 5% sorbitan monostearate in flaxseed oil was prepared. The gel was prepared by the thermal treatment described above and allowed to set at 22° C. for one day. In order to assess the rheological properties of the gel, a controlled stress rheological test was performed. Circular 1 cm diameter by 3 mm high piece of the gel was cut out and placed on a piece of 60-grit wood sandpaper soaked in flaxseed oil. A piece of 60-grit wood sandpaper was glued to a 1 cm diameter flat stainless steel geometry. The gel sample on the oil-soaked piece of sandpaper (3×2 cm) were taped to the bottom Peltier plate of the rheometer. The sample was compressed manually to achieve a normal force of approximately 0.2N to ensure good mechanical contact and no slip. The rheometer was programmed to carry out a stress sweep from 1 to 4000 Pa at a frequency of 1 Hz. The results show that the test gel is very solid-like (firm gel), with a G'/G" value of about 4. The yield stress of the gel was about 100-300 Pa.

Reference Example 3

A 6 wt. % ethylcellulose 22 cp gel containing 2 wt. % SMS in palm kernel oil (PKO) was prepared by dissolving the components at 135° C., followed by allowing the gel to set at room temperature undisturbed. The resulting gel was strong and showed no loss of free oil on standing at 55° C. for 2 hours. The gel setting temperature was determined to be 75° C., which makes it suitable for addition to chocolate compositions without excessive heating of the chocolate.

Reference Example 4

A 5 wt. % ethylcellulose 22 cp gel containing 2 wt. % glycerol monostearate (GMS) in palm kernel oil (PKO) was prepared by dissolving the components at 135° C., followed by allowing the gel to set at room temperature undisturbed. The resulting gel was strong and showed no loss of free oil on standing at 55° C. for 2 hours. The gel setting temperature was determined to be 50° C., which makes it suitable for addition to chocolate compositions without excessive heating of the chocolate.

Reference Example 5

Figure 4A:
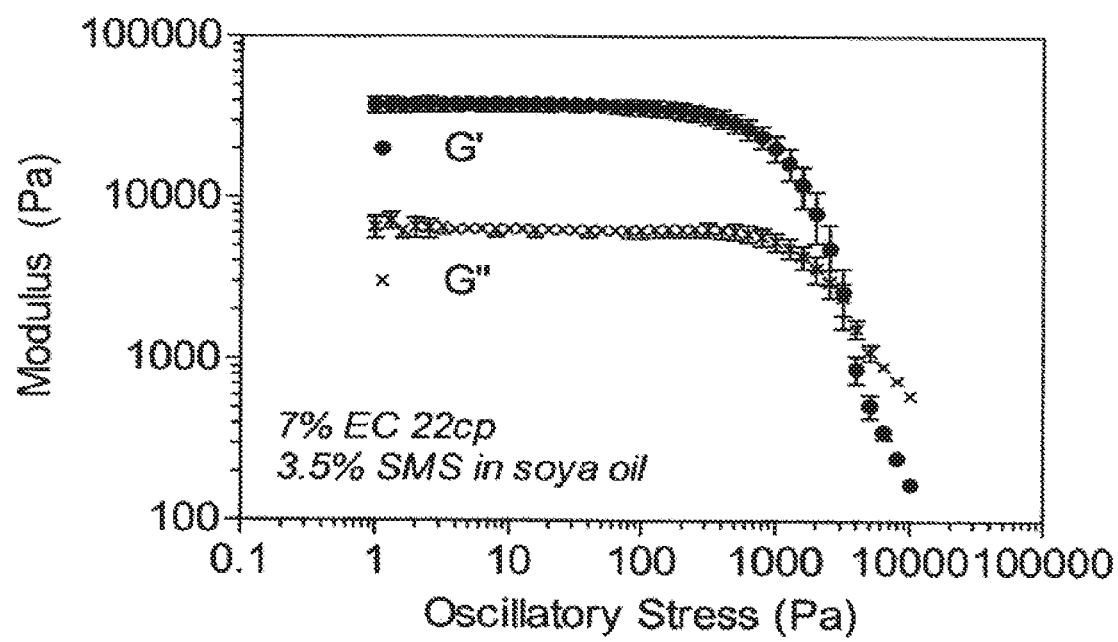
FIGS. 4A and 4B are graphs showing viscoelastic properties of an ethylcellulose oleogel.
Figure 4B:
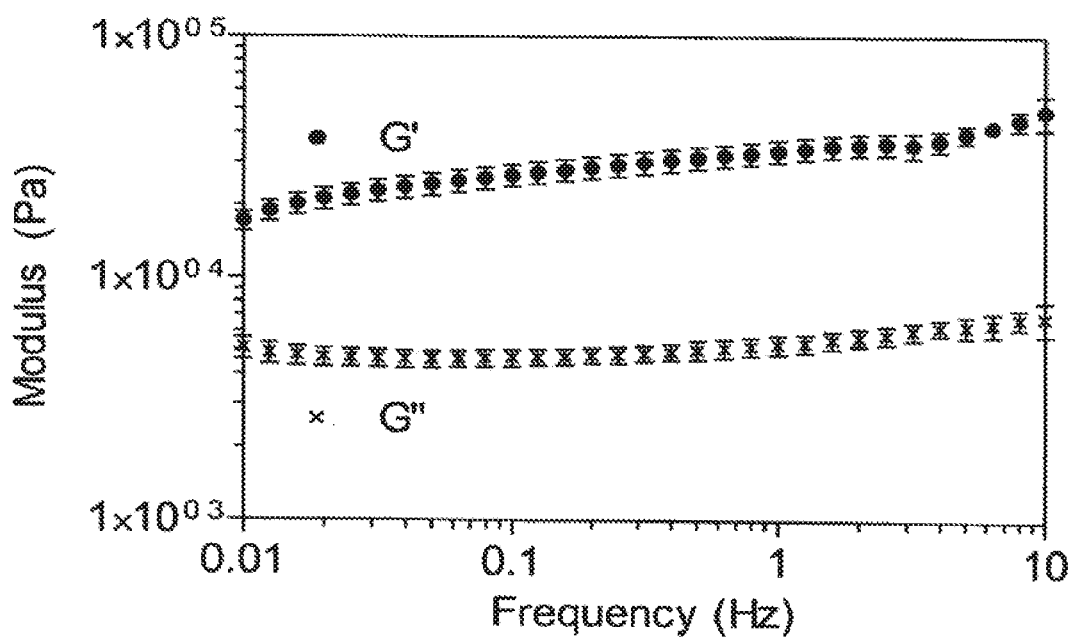

A gel of 7 wt. % ethylcellulose 22 cp, 3.5% SMS in soya oil was prepared and tested as described above in Reference Example 2. The viscoelastic data are shown in FIG. 4. It can be seen that the gel shows classical gel behaviour with linear stress/strain behaviour up to a breakdown stress of about 1000 Pa, and with G'»G".

Example 1

A heat resistant chocolate-like confectionery product was prepared according to the following process. Ethylcellulose 22 cp or 45 cp powder and sorbitan monostearate were mixed with hydrogenated palm kernel oil at a ratio of from about 3:1:12 to about 3:1:24, preferably about 18:6:76 (w/w/w). The mixture was then heated up on a hot plate to a temperature above the glass transition temperature of the ethylcellulose polymer (Tg=130° C.) with constant mixing. The polymer solution should be clear. A clear solution is indicative of the polymer being completely dissolved in the oil phase (140° C.). The mixture was then cooled to 100° C. and added to fat-reduced (18% fat), 75-80° C. molten chocolate at a ratio of 1:5 (w/w) polymer solution:molten chocolate. The final concentration of EC in chocolate would be 3% w/w, and of SMS 1% w/w. After complete mixing, the chocolate substitute was then poured into molds and cooled in a 5° C. cooling tunnel under convective cooling. The final chocolate was allowed to set overnight. The next day, the heat resistance of the chocolate was tested by placing in an oven at 52° C. The chocolate did not melt and was firm and gel-like to the touch of a metal spatula. The control chocolate, to which only hydrogenated PKO was added, processed in the same way, melted and flowed completely upon agitation or touching. This heat resistance would allow distribution in tropical countries, and would also impart resilience against temperature abuse during the summer months in the northern and southern hemispheres.

Example 2

A heat resistant chocolate is provided by the solvent substitution method as follows. ETHOCEL 45 cp and 100 cp were dissolved with constant stirring in 95-100% ethanol at a concentration of 20% (w/w) at room temperature. Compound milk chocolate (purchased from Bulk Barn, ingredients: sugar, hydrogenated palm kernel oil, cocoa, milk ingredients, soy lecithin, natural flavor) or milk chocolate (purchased from Bulk Barn, ingredients: sugar, milk ingredients, cocoa butter, unsweetened chocolate, soy lecithin, artificial flavor) was heated to 50° C. until completely molten. This melt was mixed with the ethylcellulose alcohol stock solution at a ratio of 90:10 w/w (chocolate:EC stock) and mixed thoroughly. The mix sometimes initially stiffened and appeared "dry", but with continuous mixing, it became glossy and smooth again. The final composition of the chocolate was 90% (w/w) compound chocolate, 8% (w/w) alcohol and 2% (w/w) ethylcellulose. This chocolate preparation was softer than control milk chocolate and did not have any heat resistance. The alcohol was then removed by placing the chocolate pieces in a vacuum oven (50° C., 10 kPa) for 5 hours, or left wrapped in aluminum foil at 30° C. for 7-9 days. All alcohol was thus removed by either of these treatments. The chocolate was then tested for heat resistance and found to remain firm at 55° C. relative to control. Moreover, the surface was non-sticky as well. Thus, the ethylcellulose (45 cp or 100 cp) had been successfully transferred from the alcohol to the chocolate fat matrix and imparted heat resistance, without the need for an excessive heat treatment.

Referring to Procedure 1 above, the control chocolate at 21° C. displayed a 2 mm yield force of 14700 g, while the same control at 40° C. had a yield force of 18.8 g. On the other hand, chocolates at 40° C., 50° C. and 86° C. prepared by our solvent substitution method had a yield force of 2080 g (40° C.), 859 g (50° C.) and 613 g (86° C.), respectively. Even at these high temperatures, all these heat resistant chocolates were quite firm, could be picked up by hand and were non-sticky.

While both EC preparations can be used in the preparation of the chocolate product, the 100 cp alcohol solution was more viscous than the 45 cp solution and thus more difficult to work with. The heat resistance imparted by EC100 cp was only marginally greater than that of 45 cp. Thus, in terms of ease of handling, 45 cp is a preferred polymer for this application.

Example 3

A heat-resistant chocolate was prepared by the fat substitution method as follows.

First the gel, consisting of EC, SMS and palm kernel oil (PKO) was made. The ingredients were heated to 145° C. with stirring until the mix was completely clear. The gel was then left to set and for the fat to crystallize undisturbed at room temperature. When the gel was needed for chocolate manufacture it was re-melted and stirred. The melting temperature was found to depend on the formula of the gel. For a gel containing 10.6% Ethocel® 10 cp and 3.18% SMS, the gel was heated to 68° C. and appeared as a thick, but flowable mass.

The second step was preparation of the dry ingredients. Powdered sugar was made with refined granulated sugar using either a ball mill or a blender. Powdered sugar, cocoa powder (Sobeys Compliments® brand), lecithin and PGPR (if used) were combined. The cocoa powder was assumed to contain 20% fat as that was the indicated value on the nutrition facts. The dry ingredients were mixed in a heated Hobart mixer on speed 1 until homogeneous. The mixer was attached to a water bath set at 75° C. (temperature difference between the mixer and water bath was usually around 10° C.).

Finally the warm, liquid gel was added to the warm, mixed dry ingredients. The Hobart mixer was set to speed 1 until most of the dry ingredients were wetted with the gel. The mixer was then set to speed 2 and mixed until the ingredients formed a single, homogeneous mass of chocolate. The chocolate was then mixed for an additional 60 sec. The warm chocolate was then moulded and refrigerated (5° C.) for 20-30 min. The chocolate was then demolded.

Example 4

The fat substitution procedure of Example 3 was repeated with the following formulation in parts by weight:

| Ethocel 10 cP | 1.50 |
| --- | --- |
| Sugar (powdered) | 15.00 |
| Cocoa Powder (20% Fat) | 7.51 |
| PKO | 7.27 |
| Lecithin | 0.16 |
| PGPR | 0.08 |

The resulting chocolate exhibited a 2 mm yield stress of 407 gf at 40° C., indicative of good heat resistance.

Example 5

The effect of varying the amount and the viscosity of ethylcellulose in the solvent-substituted chocolate products of the invention was investigated as follows.

Figure 2:
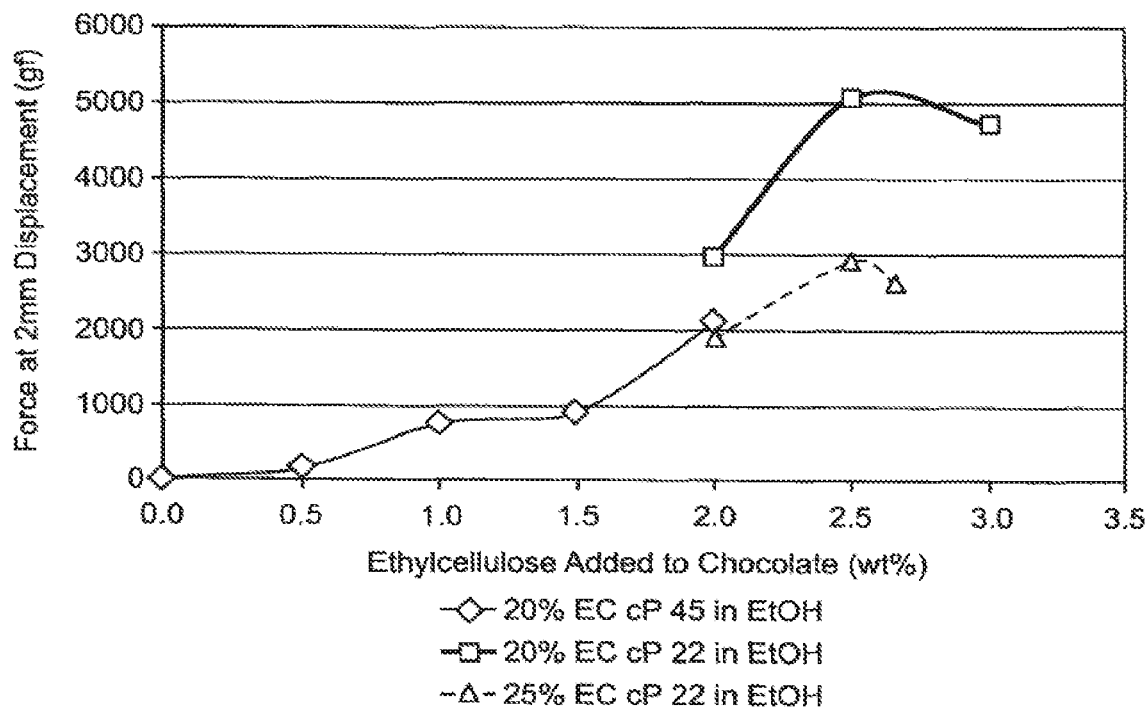
FIG. 2 shows a graph of yield stress at 40° C. versus ethylcellulose content for a first compound milk chocolate made by the solvent substitution method.

Chocolates were prepared using the solvent substitution method. Solutions of 20% EC cP, 20% EC 22 cP, and 25% EC 22 cP in EtOH were made. These solutions were then added to compound milk chocolate from Bulk Barn. Results from 2 mm deformation tests at 40° C. are shown in FIG. 2. At equal concentrations of ethylcellulose the 20% solutions were more heat resistant than the 25% solution. Furthermore, EC 22 cP showed more heat resistance than EC 45 cP at the same concentration of EC mix. Generally, very good heat resistance is seen at around 2.0-2.5% ethylcellulose.

It was also found that chocolates hardened in the fridge showed less heat resistance than chocolates with the same composition but hardened at room temperature (2339.65 and 2950.85 gf respectively). However, chocolates hardened at room temperature were generally more difficult to demold than those hardened in the fridge.

Example 6

The effect of varying the compound chocolate composition and the source of ethylcellulose was studied by performing comparison tests similar to those of Example 4 on a second compound milk chocolate starting material (Barry Callebaut) and on a dark compound chocolate (Barry Callebaut).

Figure 3A:
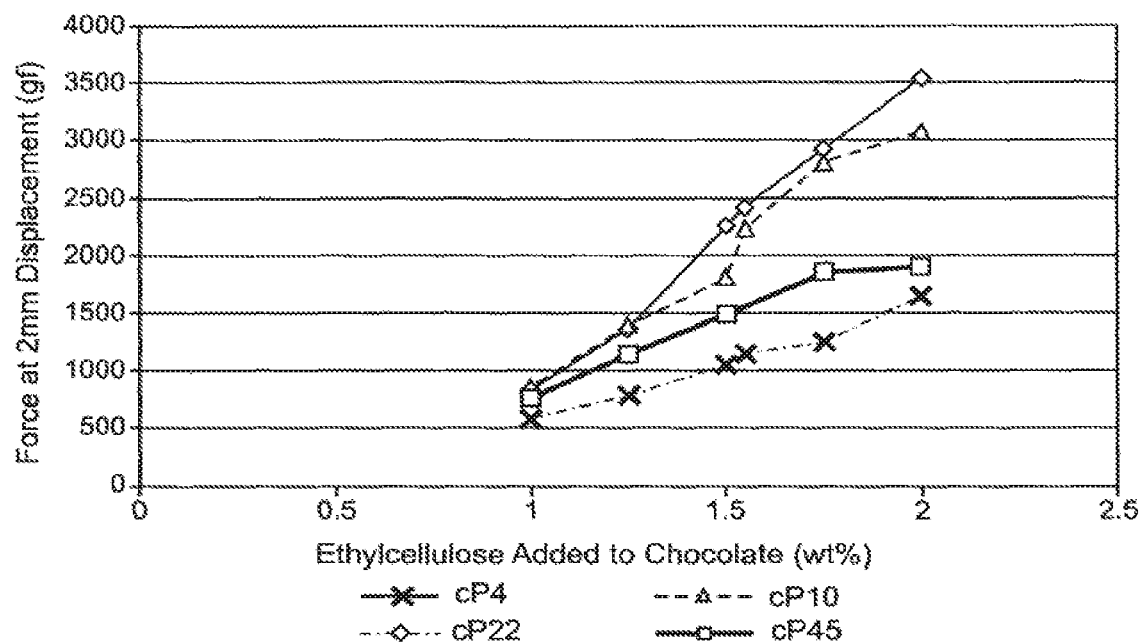
FIGS. 3A and 3B show graphs of yield stress at 40° C. versus ethylcellulose content for (FIG. 3A) a second compound milk chocolate or (FIG. 3B) a compound dark chocolate.
Figure 3B:
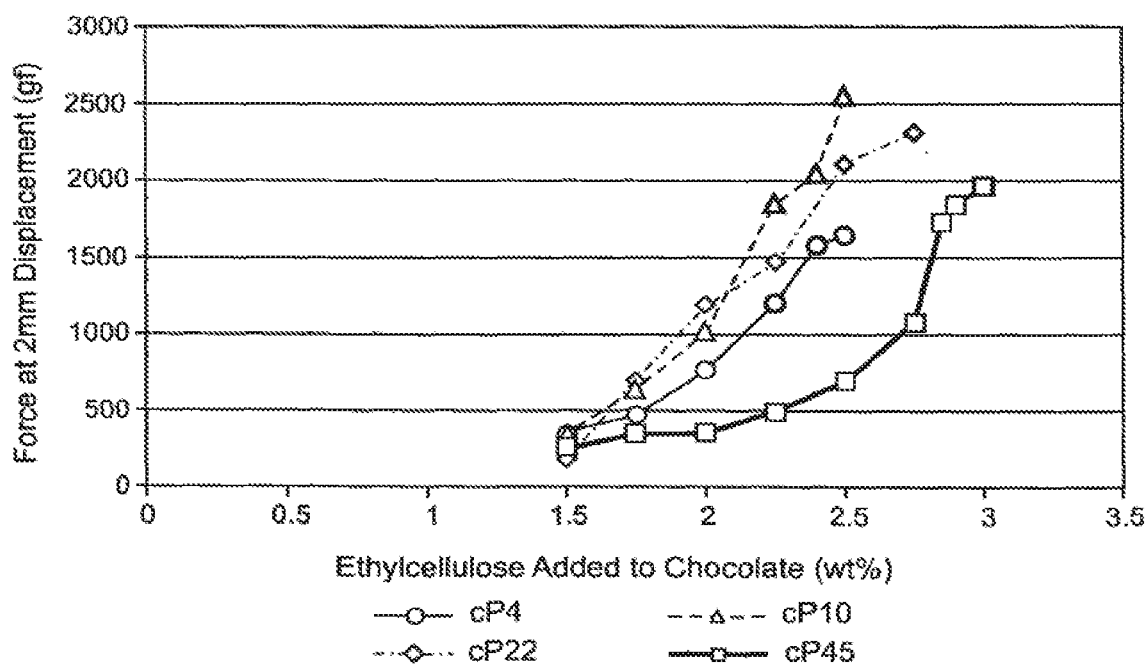

The solvent substitution method was used to produce heat resistant chocolate with Barry Callebaut compound milk and dark chocolates. Specifically, Milk Snaps and Dark Sweet Snaps were used. Heat resistant milk chocolate was easily produced. However, dark compound chocolate proved difficult to use in the production of sufficiently heat resistant, yet mouldable chocolate. Various viscosities of polymer dissolved at 20% wt/wt levels in ethanol were incorporated into the chocolate. Results are depicted in FIG. 3A for milk chocolate and FIG. 3B for dark chocolate. EC with viscosities 4 cP and 45 cP were from The Dow Chemical Company whereas EC 10 cP and 22 cP were from Sigma-Aldrich Co. In all cases, there is a marked increase in heat resistance of the chocolate at 40° C. as the ethylcellulose content is increased towards 2% w/w. Although there are differences in heat resistance of chocolates made with different EC viscosities, the main trend seems to be that Sigma-Aldrich Co EC tends to provide more heat resistance to the chocolate than EC from The Dow Chemical Company.

Example 7

The above examples are based on compound chocolate compositions. In addition, real chocolate compositions according to the invention were prepared as follows.

Table top, seed, and direct methods of tempering were tried for milk, white, and dark chocolate. Seed chocolate was produced for use in a Revolation 2 Chocolate Tempering Machine (ChocoVision, Poughkeepsie, N.Y.) using the table top tempering method. The table top method started by melting chocolate slowly in a microwave until a temperature around 40° C. was attained. Approximately one third of the melted chocolate was poured onto a cool, thick, metal table. The chocolate was then spread out then folded back into a mound. This was repeated until some of the chocolate appeared lighter, thicker, and less shiny. This chocolate was added back to the rest of the chocolate and stirred. The spreading, folding and reincorporation steps were repeated until the chocolate reached a temperature of 28-29° C. If the chocolate became too cool then it was warmed to its working temperature (31° C., 30° C., and 28° C. for dark, milk and white chocolate respectively). To ensure the chocolate was in temper, the tip of a small spatula was dipped in the chocolate and left for a few minutes at room temperature. Temper was achieved if after a few minutes the chocolate was hard, glossy, smooth, and lacked streaks. The properly tempered chocolate was then moulded and placed in the fridge for 15-20 min. A cheese grater with fine grating slots was used to shave the chocolate into small seeds. The seed chocolate was then stored and used as needed with the tempering machine.

To temper chocolate using the Revolation 2 chocolate was added to the assembled machine, melted and brought to 34.4° C. This temperature was chosen because it was the lowest temperature the machine would accept for the melting stage of tempering and would save time during the cooling process. However, if the chocolate pieces used showed signs of bloom higher temperatures around 40° C. were used to ensure all crystal memory was erased. Once melted, the chocolate was cooled to the working temperature mentioned previously. During cooling, seed chocolate was slowly added to the melted chocolate. The amount of seed added was approximately 3-6% by weight of the total weight of chocolate. A plastic spatula was used to enhance mixing during this stage. When the working temperature was achieved the chocolate was checked as above to make certain it was in temper.

ETHOCEL 22 cp in both 20 and 25% wt/wt in EtOH solutions were incorporated into Barry Callebaut tempered Tulsa Dark, Kenosha Milk, and Ultimate White chocolate at various concentrations. The EC mix was added about 10 min after the tempering process was completed once good temper was confirmed. As previously observed, samples made with EC from 20% in EtOH solutions showed greater heat resistance than samples made with EC from 25% in EtOH solutions.

It was found that white chocolate required 1.6% EC to give 2000 gf. However, adding this much EC caused the white chocolate to thicken so much that it was paste-like and would not flow enough to level-out in the moulds. Efforts focused on thinning the chocolate to improve mouldability by adding cocoa butter (CB) or polyglycerol polyricinoleate (PGPR)

Results are shown in Table 1 with the yield forces at 40° C.

TABLE 1

| Chocolate Type | % EC 22 cp | % CB Added to Chocolate | % PGPR in System | Force at 2 mm Displacement | Mouldability |
|---|---|---|---|---|---|
| Milk | 1.55 | — | — | 2244.90 | Good |
| White | 1.55 | 6.60 | — | 1297.08 | Good |
| White | 1.60 | 3.10 | — | 1463.38 | Good |
| White | 1.60 | 1.60 | — | 1656.83 | Good |
| Dark | 1.90 | 1.90 | — | 1027.03 | Good |
| Dark | 1.90 | 0.90 | — | 1239.43 | Good |
| Dark | 1.90 | 0.90 | — | 1376.03 | Good |
| Dark | 2.05 | 0.50 | — | 2476.95 | OK (sets fast) |
| Dark | 1.95 | — | 0.50 | 1445.93 | OK (sets fast) |
| Dark | 1.95 | 0.50 | — | 1907.18 | OK |

Some of the chocolate compositions exhibited swirls or other non-uniform surface appearance. This was found especially for dark chocolate compositions. It was determined that the heat resistant dark chocolate with best appearance was produced when no heat was added during incorporation of EC, the mix was stirred for 60 s, the filled moulds were placed in the fridge (5° C.) for 15 min and then held in the mould at 20° C. for 45 min or more. This chocolate contained 1.95% EC 22 cP from a 20% EC in EtOH mix and had no added cocoa butter or PGPR.

Example 8

A real-type chocolate composition was made by the fat substitution method, according to the following recipe in parts by weight:

| | |
|---|---|
| Ethocel 10 cp | 1.5 |
| SMS | 0.5 |
| Sugar (powdered) | 25.02 |
| Cocoa Powder (20% Fat) | 10.62 |
| Cocoa Butter | 12.12 |
| Lecithin | 0.27 |

The fat phase of a cocoa butter chocolate was made into an organogel by mixing ethylcellulose (EC) 10 cP and sorbitan monostearate (SMS) with cocoa butter. The mix was heated with stirring until the solids dissolved at =150° C. The mix was left to set at room temperature (25° C.). After having set, the gel was heated by placing in a water bath at 45° C. While the gel was being heated, cocoa powder, sugar and lecithin were added to a Hobart mixer and mixed at speed 1. The mixing bowl was heated by an attached circulating water bath set at 29° C. Once melted, one third of the cocoa butter gel was transferred to a cool, thick, metal table for tempering. The gel was spread thinly on the table and then folded back into a mound. This was repeated until the gel reached a temperature around 28° C. The gel was then added back to the rest of the gel and stirred. The spreading, folding and reincorporation steps were repeated until the whole batch of gel reached a temperature of 28-29° C. The gel was then added to the mixing bowl. The ingredients were blended in the mixer at speed 1 until the powders appeared wetted with the oil. The mixer was then turned to speed 2. The mix was allowed to blend until it looked homogeneous and formed a single ball of dough-like chocolate (about 1.5 min). The chocolate was moulded and then hardened in a refrigerator (5° C.) for 20 min. The chocolates were then tested for heat resistance at 40° C. The yield force at 2 mm displacement was found to be 108 gf, which is considerably higher than for a pure cocoa-butter real chocolate, since pure cocoa butter melts below 40° C.

Example 9

The method of Example 3 was repeated to make a series of chocolate compositions in which a fraction of the PKO has been replaced by 10%, 20% and 30% by weight, based on the weight of the PKO, of flaxseed oil (reference examples) or ethylcellulose-gelled flaxseed oil/PKO blends, as follows (formulations in weight %):

TABLE 2

|  | Control | 10% Oil | 10% Oleogel |
|---|---|---|---|
| sugar | 50.01 | 50 | 50.01 |
| Cocoa (20% fat) | 25.01 | 25.01 | 24.53 |
| PKO | 24.49 | 21.55 | 21.64 |
| Flaxseed Oil |  | 2.95 | 2.95 |
| Lecithin | 0.51 | 0.51 | 0.51 |
| Ethocel 10 cp |  |  | 0.3 |
| SMS |  |  | 0.09 |

|  | 20% Oil | 20% Oleogel | 30% Oil | 30% Oleogel |
|---|---|---|---|---|
| sugar | 50.01 | 50.01 | 50.01 | 50.01 |
| Cocoa (20% fat) | 25.01 | 24.04 | 25 | 23.56 |
| PKO | 18.59 | 18.78 | 15.65 | 15.93 |
| Flaxseed Oil | 5.9 | 5.91 | 8.85 | 8.85 |
| Lecithin | 0.51 | 0.51 | 0.51 | 0.51 |
| Ethocel 10 cp |  | 0.59 |  | 0.89 |
| SMS |  | 0.18 |  | 0.27 |

Measurements of yield stress of the resulting chocolate compositions showed an increase in the measured yield stress at 2 mm displacement for the compositions made with oleogels relative to those made with equal amounts of oil.

This example demonstrates that the formation of oleogels with ethylcellulose may permit the replacement of cocoa butter or PKO in conventional chocolate by low viscosity oils such as flaxseed oil, thereby greatly expanding the range of available chocolate compositions.

Example 10

Fat-based cream fillings were prepared to study the effect of using gelled oils on fat migration, as follows.

Cream fillings were prepared with 40% hard fat and 60% oil or organogel. The hard fat used was interesterified hydrogenated palm oil (IHPO) and the oils used were either canola or high oleic sunflower oil (HOSO). The organogel was prepared by mixing 6% ethylcellulose (EC) cP 45 and 2% sorbitan monostearate (SMS) in oil. The mix was then heated with stirring until the solids dissolved at =150° C. The mix was left to set at room temperature (25° C.). After having set, the gel was heated by placing in a water bath at 60° C. The warmed gel was then added to the melted, interesterified hydrogenated palm oil (IHPO). A control blend was prepared by mixing oil at 60° C. and melted IHPO. The procedures were the same for sample and control from this point forward. The blends were mixed on a stir plate (400 rpm) for 1 min. The blends were then poured into cylindrical moulds (diameter=2 cm, length=0.4 cm) and left at room temperature until set. The moulds were placed in a refrigerator (5° C.) for 20 min to ease in demoulding of the cream pucks. The cream pucks may then be coated in chocolate to form filled chocolates according to the invention, for example by dipping or enrobing in melted chocolate in conventional fashion.

In order to compare oil migration rates, filter papers were weighed and one cream puck was weighed and placed on the centre of the paper. Cream samples were then placed in an incubator at either 20 or 25° C. The pucks were periodically removed and the weight of the paper recorded to monitor the amount of oil leaked. The cream fillings were formulated as follows:

TABLE 3

|  |  | Recipe | Actual |
|---|---|---|---|
| "HOSO Gel" | Sample |  |  |
|  | IHPO | 20 | 20 |
|  | HOSO | 27.6 | 27.6 |
|  | EC | 1.8 | 1.8 |
|  | SMS | 0.6 | 0.6 |
|  | Control |  |  |
| "HOSO Oil" | IHPO | 20 | 20 |
|  | HOSO | 30 | 30 |
|  | Sample |  |  |
| "Canola Gel" | IHPO | 20 | 20 |
|  | Canola Oil | 27.6 | 27.61 |
|  | EC | 1.8 | 1.8 |
|  | SMS | 0.6 | 0.6 |
|  | Control |  |  |
| "Canola Oil" | IHPO | 20 | 20 |
|  | Canola Oil | 30 | 30.01 |

Figure 5:
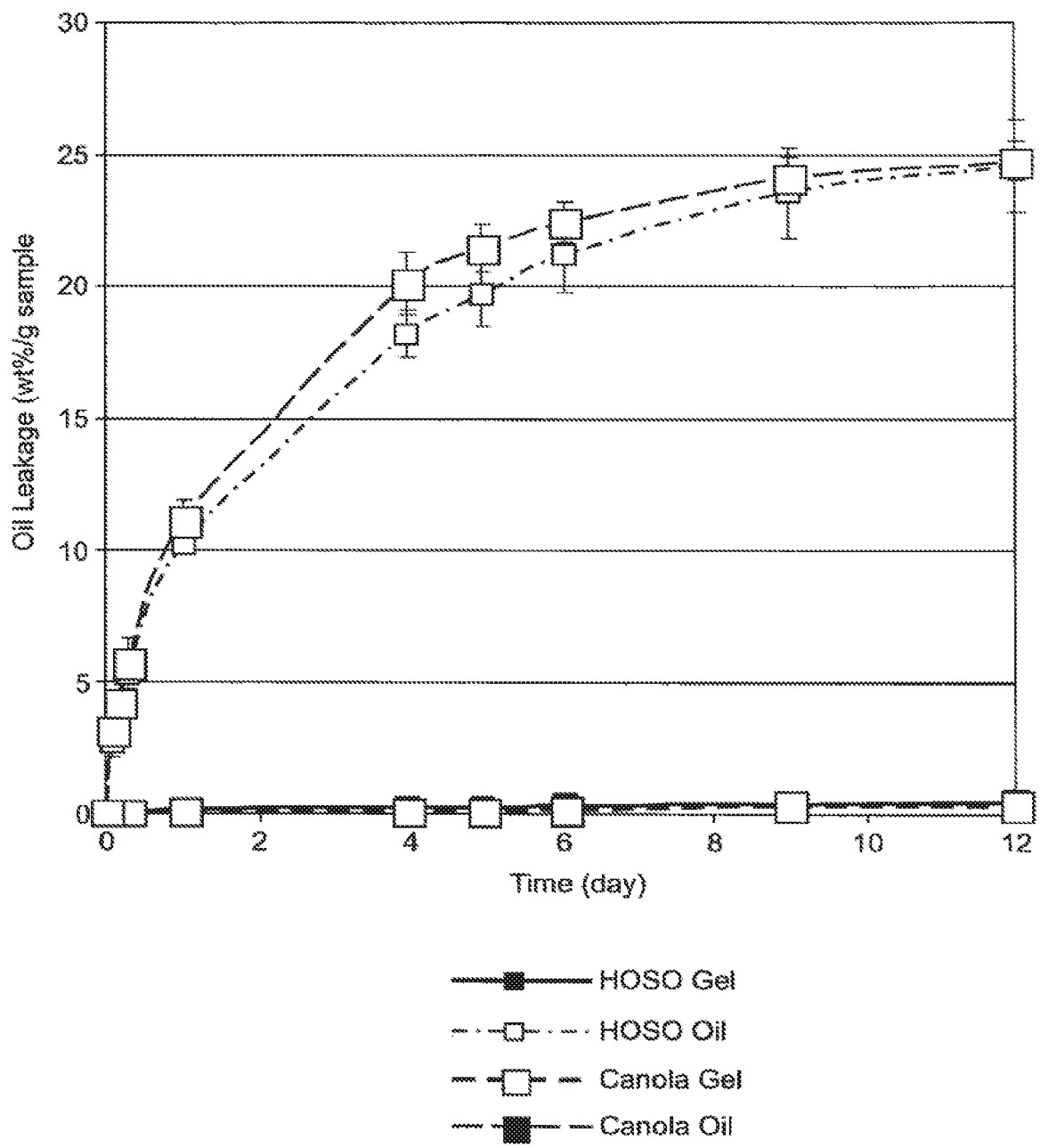
FIG. 5 is a graph of oil migration against time for cream fillings for use in filled chocolates of the invention.

The results of the oil migration study at 20° C. are shown in FIG. 5. It can be seen that the creams formulated with the oleogels exhibit minimal oil migration into the filter paper compared to the creams formulated with the oils. This is a clear indication that chocolates filled with the oleogel formulations will exhibit less oil migration problems.

The present invention provides novel methods of preparing chocolate compositions and filled chocolates. The methods can be used in a variety of applications such as to increase heat resistance of chocolate, to incorporate a wide range oils in chocolate, and/or to reduce oil migration in filled chocolates.

The above embodiments have been described by way of example only. Many other embodiments falling within the scope of the accompanying claims will be apparent to the skilled reader.

The invention claimed is:

1. A method of preparing a chocolate composition, said method comprising:
    a) preparing a mixture of food-grade ethylcellulose in an edible oil;
    b) adding a surfactant to the ethylcellulose and oil mixture;
    c) heating the ethylcellulose/oil/surfactant mixture to a temperature above the glass transition temperature of the ethylcellulose with mixing to form an oleogel stock, followed by
    d) adding the oleogel stock to a chocolate composition.

2. The method according to claim 1, wherein the ethylcellulose/oil/surfactant mixture comprises ethylcellulose, sorbitan monostearate (SMS) and the oil.

3. The method of claim 1, further comprising cooling the chocolate composition to form a chocolate.

4. The method of claim 3, wherein the chocolate is a heat resistant chocolate.

5. The method of claim 3, wherein the chocolate comprises from 1 wt. % to about 3 wt. % of ethylcellulose.

6. The method of claim 3, wherein the chocolate exhibits a yield stress at 40° C. greater than about 300 gf.

7. The method of claim 1, wherein the oil is selected from the group consisting of soybean oil, canola oil, corn oil, sunflower oil, safflower oil, flaxseed oil, almond oil, peanut oil, fish oil, algal oil, palm oil, palm stearin, palm olein, palm kernel oil, high oleic soybean or canola or sunflower or safflower oils, hydrogenated palm kernel oil, hydrogenated palm stearin, fully hydrogenated soybean or canola or cottonseed oils, high stearic sunflower oil, interesterified oils, butteroil, cocoa butter, avocado oil, coconut oil, cottonseed oil, and mixtures thereof.

8. The method of claim 1, wherein the oil comprises palm kernel oil, cocoa butter or a mixture thereof.

9. The method of claim 1, wherein the surfactant is selected from the group consisting of polyoxyethylene sorbitan monooleate (Tween 80), polyoxyethylene sorbitan monostearate (Tween 60), sorbitan monooleate (SMO or Span 80), sorbitan monostearate (SMS or Span 60), glyceryl monooleate (GMO), glyceryl monostearate (GMS), glyceryl monopalmitate (GMP), polyglyceryl ester of lauric acid—polyglyceryl polylaurate (PGPL), polyglyceryl ester of stearic acid—polyglyceryl polystearate (PGPS), polyglyceryl ester of oleic acid—polyglyceryl polyoleate (PGPO), and polyglyceryl ester of ricinoleic acid—polyglyceryl polyricinoleate (PGPR).

10. The method of claim 9, wherein the surfactant is selected from the group consisting of SMS, GMS, SMO, GMO and PGPL.

11. The method of claim 9, wherein the surfactant is SMS.

12. The method of claim 1, wherein the surfactant is an ester of a saturated $C_{12}$-$C_{24}$ fatty acid with a polyhydric alcohol having four or more hydroxyl groups.

13. The method of claim 1, wherein the ethylcellulose-to-surfactant ratio in the ethylcellulose/oil/surfactant mixture is from 10:1 to 1:1 w/w.

* * * * *